June 5, 1945.　　　T. J. COLLINGS　　　2,377,838
MOTOR VEHICLE
Filed June 9, 1943　　　2 Sheets-Sheet 1
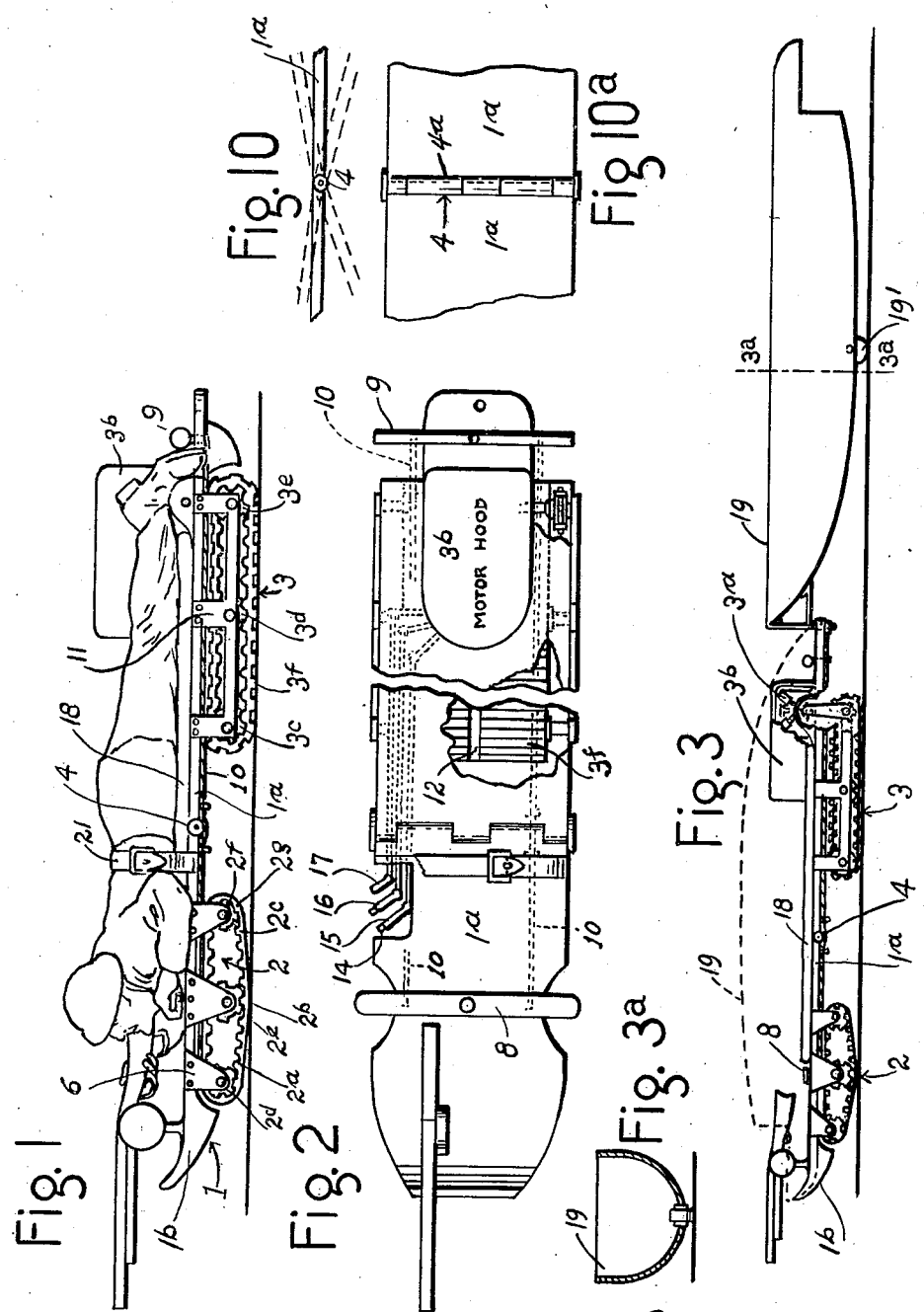

June 5, 1945. T. J. COLLINGS 2,377,838
MOTOR VEHICLE
Filed June 9, 1943 2 Sheets-Sheet 2
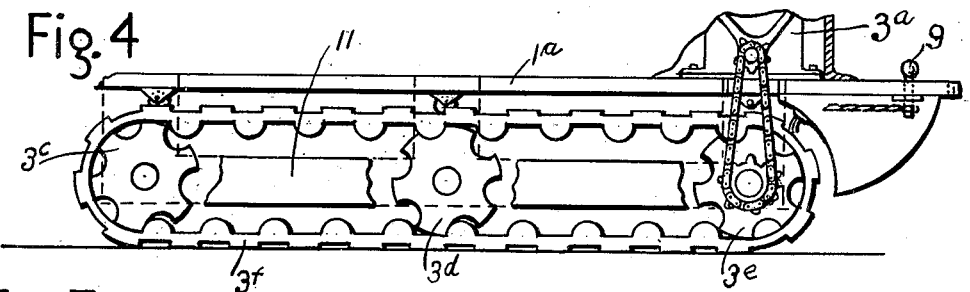
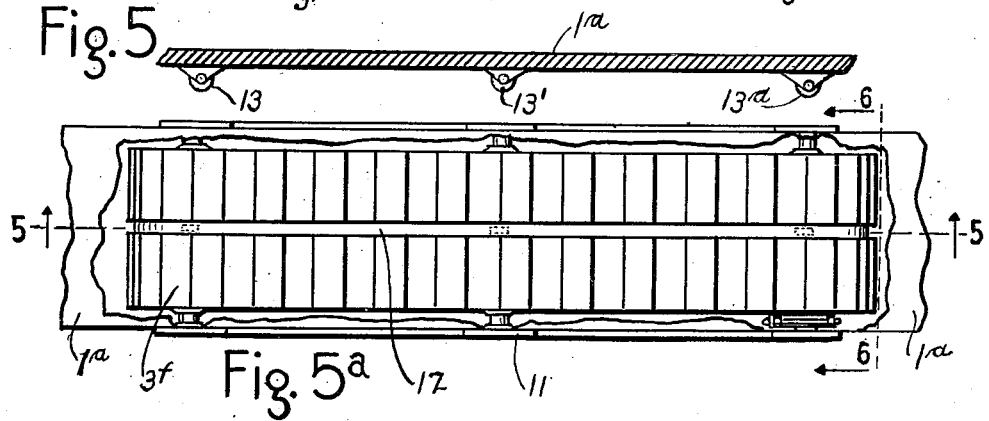
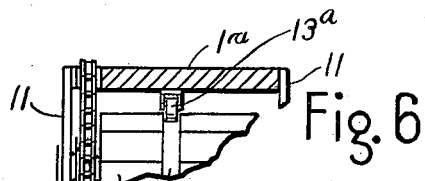
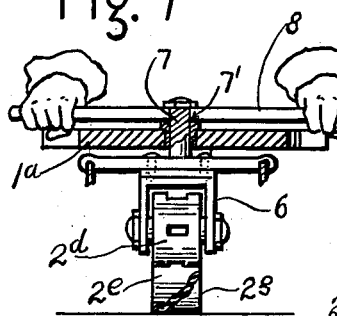
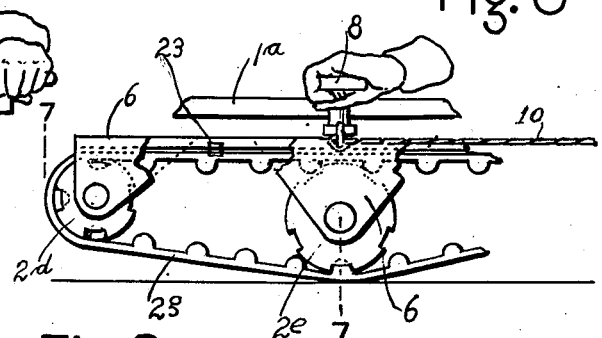
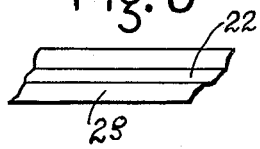
INVENTOR.
Thomas J. Collings
BY
Joseph F. O'Brien
Attorney Patented June 5, 1945

2,377,838

UNITED STATES PATENT OFFICE 2,377,838

MOTOR VEHICLE

Thomas J. Collings, New York, N. Y.

Application June 9, 1943, Serial No. 490,176

2 Claims. (Cl. 180—9.1)

This invention relates to improvements in motor vehicles.

One of the objects of this invention is the provision of a motor vehicle, having a sled-like chassis preferably movable close to the ground, to carry an occupant such as a soldier in prone position, and also adapted for steering and operation by such occupant while in such prone position.

Another object of my invention is to provide a relatively narrow and elongated vehicle having a chassis of a length and width substantially corresponding to the height and breadth of an average person and being positioned close to the ground and supported upon and propelled by a propelling track assembly comprising a plurality of wheel or roller members of small diameter and a continuous track mounted thereon.

Another object is, in a vehicle of the kind specified, to utilize a vehicle-cover, preferably of elongated shell-shaped configuration, adapted to provide shelter on the vehicle for the occupant and convertible when desired, into a trailer capable of carrying any suitable load.

Another object of my invention is to provide a motor vehicle in which the motor will be positioned at the rear of the vehicle in such position that the legs of an operator in prone position will extend on opposite sides of the engine or motor hood.

Another object of my invention is to provide an elongated vehicle comprising a propelling section having a motor centrally located with space at opposite sides thereof for the legs of the user and a body-carrying section connected to and extending forwardly from the propelling section and adapted to carry the body of a soldier in prone position.

Another object of my invention is to provide a vehicle composed of a plurality of hinged sections, one of which comprises a propelling section and the other a carrying section.

In the accompanying drawings—

Fig. 1 is a view in side elevation of a motor-propelled vehicle of my invention with a soldier in prone position strapped thereon;

Fig. 2 is a plan view of the vehicle shown in Fig. 1;

Fig. 3 is a view in side elevation of my motor-propelled vehicle showing in dotted lines a shell-shaped protective housing convertible when inverted into a trailer;

Fig. 3a is a section on the line 3a—3a of Fig. 3.

Fig. 4 is a view in side elevation of the propelling half-track tread member employed by me;

Fig. 5 is a longitudinal fragmentary section, on the line 5—5 of Fig. 5a.

Fig. 5a is a fragmentary plan showing the chassis broken away to expose the half-track belt employed by me;

Fig. 6 is a fragmentary section of the chassis and rear half-track, on the line 6—6 of Fig. 5a looking in the direction of the arrows;

Fig. 7 is a section of the chassis and steering mechanism on the line 7—7 of Fig. 8 looking in the direction of the arrows;

Fig. 8 is an enlarged fragmentary view in side elevation of the front part of the chassis and the steering mechanism employed by me;

Fig. 9 is a view in plan of a fragmentary portion of the steering belt or tread member; and Figs. 10 and 10a are fragmentary views of the hinged joint employed by me between the rear and forward sections of my vehicle.

Referring now to these drawings, 1 indicates a vehicle having an elongated sled-like chassis 1a provided at its forward end with an upturned nose-portion 1b having its bottom surface inclined and preferably curved in a downward and rearward direction to contact with and glide over raised terrain or raised obstacles in the path of the vehicle. The chassis 1a is positioned close to the ground and as illustrated, is mounted on a rolling under carriage comprising a steering half-track assembly 2 at the forward end and a propelling half-track assembly 3 at the rear end, the latter being driven by a motor 3a mounted at the rear end of the chassis 1a in a position that will extend between the outstretched legs of the vehicle occupant and will provide supporting space for the legs and knees of such occupant on opposite sides of the protecting hood 3b therefor.

In the embodiment illustrated, the lower inclined surface of the nose-portion 1b is adapted to merge with a downwardly inclined front portion 2a of the forward angularly-shaped half track assembly 2. The front portion 2a is adapted upon a forwardly propelled movement of the vehicle 1 to contact with and provide traction upon upwardly-inclined terrain or hills, the middle portion 2b provides a contact and traction for level ground and facilitates steering while the rear portion 2c provides traction going down hills. The chassis 1a preferably corresponds in length and width to the average human occupant of the vehicle, such as a soldier, and preferably comprises a plurality of sections hinged together to permit the chassis to bend intermediate its ends in order to follow more closely the contour of the terrain over which it is propelled and to avoid undue upward projection of the front end of the vehicle when climbing short hillocks or the like. As shown, the chassis comprises two sections hingedly connected together by a knuckle joint 4 as shown in Fig. 10 that will permit a limited or given degree of hinge movement which may obviously be varied by suitably proportioning the parts or in any other suitable manner. The knuckle joint shown will permit a slight upward hinged movement and a somewhat greater downward hinged movement because of the relative outward projection or extension of the hinging knuckles 4a beyond the level of the hinged surfaces.

In the embodiment shown, the angular forward half track 2 is utilized to steer the vehicle as well as to provide suitable traction for the forward end thereof on inclines and said half track comprises three rollers or wheels 2c, 2d, 2e and a tread member 2f. The toothed wheels mesh with the tread member and are mounted in a suitable bearing frame 6. Said frame 6 is pivoted at 7' on a vertical steering member 7 passing through the chassis and controlled by a stick 8 above the deck of the chassis and operable to swing the half track 2 about the pivot 7 to steer the vehicle. Any suitable conventional steering rods or gears may be interposed between the stick 8 and the frame 6, but it is important that the stick 8 be in a position that is reachable by the hands of an occupant of the vehicle in prone position, and in the preferred embodiment of my invention I provide for dual steering control, said control member 8 being operable by the hands of the occupant and another control member 9 being connected by flexible connections 10 and placed at the rear end of the vehicle in position for operation by the feet of the occupant in such prone position.

My preferred propelling mechanism comprises a rear half-track assembly comprising three toothed rollers or wheels 3c, 3d and 3e and a tread member 3f having depressions meshing with the teeth of the rollers 3c, 3d, and 3e which are preferably of similar diameter and are mounted in suitable bearing frames 11 fixedly mounted on the chassis. The tread member is preferably held in aligned position with the chassis and roller-teeth by providing in the tread a middle channel 12 and mounting on the chassis at the front middle and rear of the half-track tread rollers 13, 13' and 13a fitting into said channel.

Suitable means for controlling the engine is provided and as shown, I provide in position at the front of the vehicle in position for operation by the hands of the occupant in prone position, a starting member 14, an accelerator member 15, a gear-shift and clutch member 16 and a brake member 17.

An important item of my invention comprises the provision and fastening on the deck of the chassis of a mattress 18, preferably comprising an air-filled deflatable and inflatable mattress on which the occupant or rider lies and which absorbs the shocks encountered in riding on a vehicle close to the ground and when riding over rough terrain, and which mattress extends to the forward end to provide rests for the arms and straddles the hood of the motor to provide cushioning rests for the knees and legs of the rider or occupant.

It is desirable that the rider in a vehicle of this type be protected and I preferably provide a substantially triangular shell-like cover member 19 adapted to fit over the rider in prone position and having in its top portion a wheel so that it may be converted into a trailer and fastened to the rear of the vehicle for the transportation of ammunition or another rider, such as a wounded soldier.

A readily fastenable and unfastenable strap 21 of the type employed on airplane seats is preferably provided on the chassis to fasten the rider in place and allow the use of both hands for manipulating a gun or the steering wheel.

Operation of the vehicle will be similar in all respects to a motorcycle except that the controlling members are positioned at the front of a sled-like vehicle in position for operation by an occupant or rider in prone position.

The forward steering assembly also preferably has a longitudinal channel groove 22 in the tread 2f and rollers 23 on the bearing frame 6 to retain the same in aligned position with the mounting frame and to keep the tread member 2f from moving off the rollers 2c, 2d and 2e. This channel 22 will also maintain better traction and prevent accidental side-slipping when the vehicle is passing over slippery surfaces.

Having described my invention, I claim:

1. A motor vehicle comprising an elongated chassis substantially corresponding in length to the average length of a human occupant in prone position, means for mounting said chassis on a rolling undercarriage, a motor located centrally at the rear of said chassis to enable straddling thereof by the legs of said occupant, control mechanism for said motor extending forwardly within reach of the hands of the occupant in such prone position for operating said motor, a shell-shaped cover for said chassis having a wheel in its top to cause said cover to be convertible into a trailer and means for connecting said trailer to said chassis.

2. A motor-vehicle comprising an elongated chassis substantially corresponding in length to the average length of a human occupant in prone position, means for mounting said chassis on a rolling undercarriage comprising longitudinally spaced front and rear half-tracks of substantially similar height, a motor located centrally at the rear of said chassis to enable straddling thereof by the legs of the occupant, control mechanism for said motor extending forwardly within the reach of the hand of the occupant in such prone position for operating said motor, said chassis comprising front and rear sections substantially equal in length and hinged together between said half-tracks to permit the following of ground contour, the said hinged portions being arranged to provide a limited upward movement of the hinged joint to avoid excessive upward projection of the elongated chassis when traveling over hillocks.

THOMAS J. COLLINGS.